Figure 1:
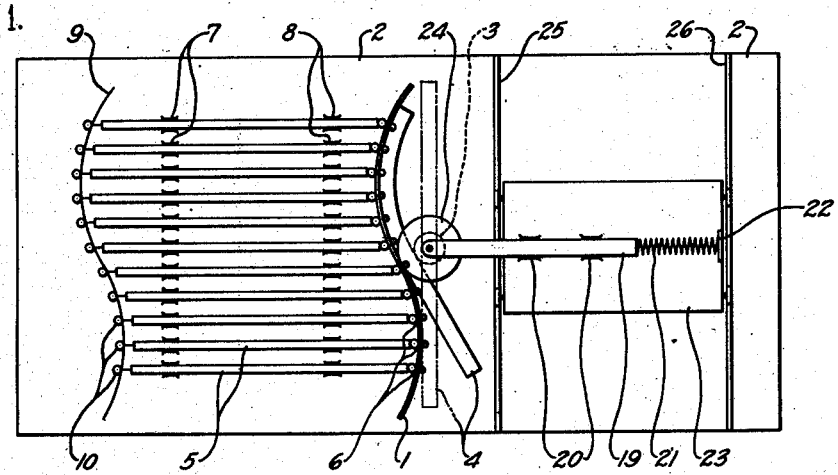

Aug. 15, 1950   M. MAUGÉ   2,518,918
APPARATUS FOR BENDING GLASS BODIES
Filed July 8, 1947   4 Sheets-Sheet 1

Inventor:
Maurice Maugé,
by Vernet C. Kauffman
His Attorney.

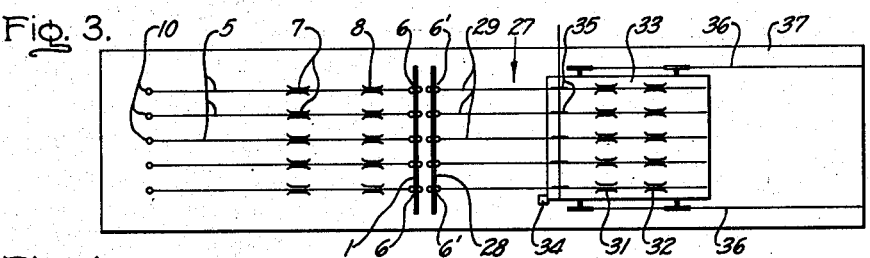
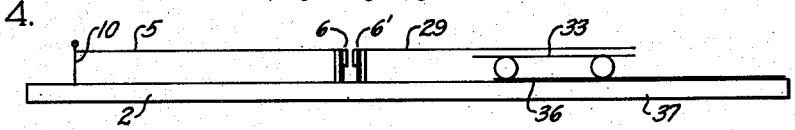
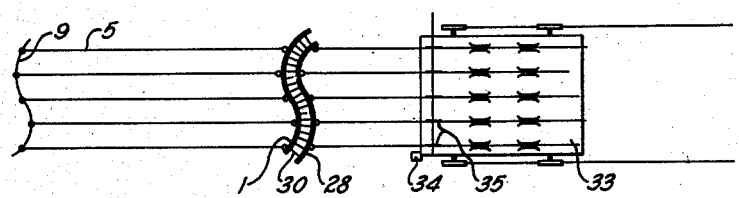
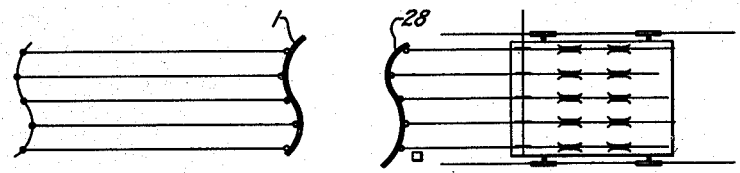
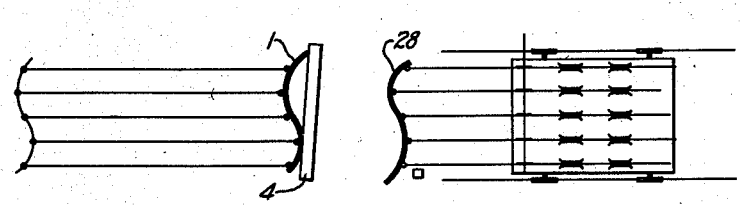
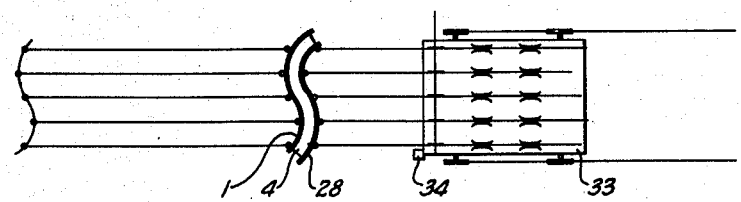

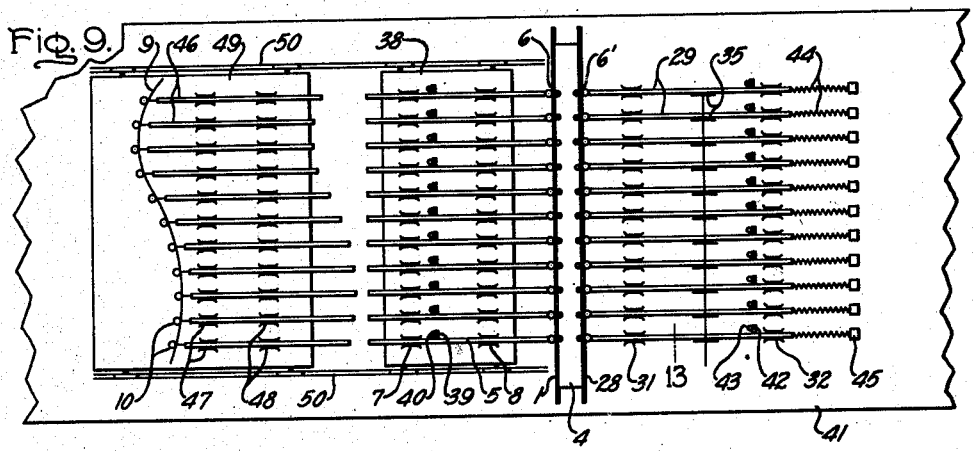
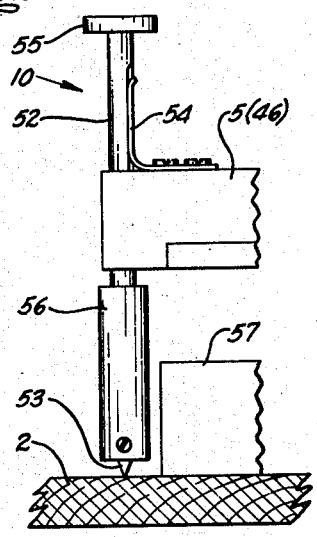
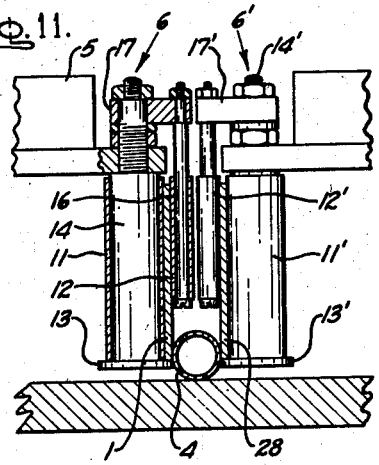
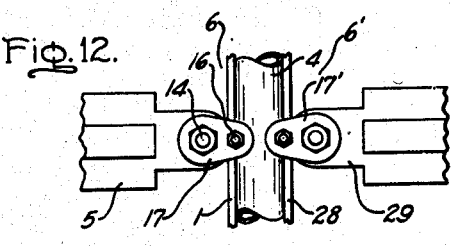

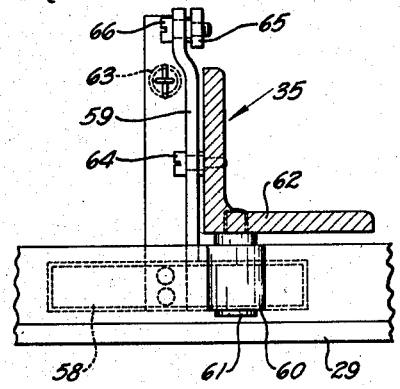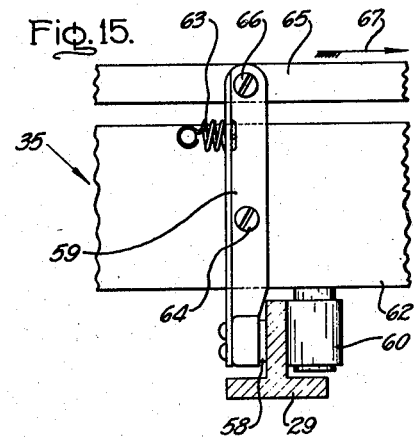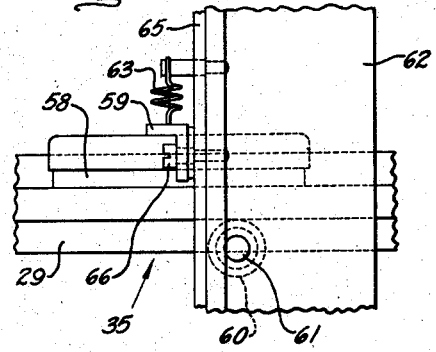

Patented Aug. 15, 1950

2,518,918

UNITED STATES PATENT OFFICE 2,518,918

APPARATUS FOR BENDING GLASS BODIES

Maurice Maugé, Paris, France, assignor to General Electric Company, Cleveland, Ohio Application July 8, 1947, Serial No. 759,536
In France January 9, 1946

Section 1, Public Law 690, August 8, 1946
Patent expires January 9, 1966

14 Claims. (Cl. 49—7)

My invention relates to apparatus for bending glass bodies and more particularly elongated glass bodies such as tubing or rod. Still more particularly my invention relates to readily adaptable apparatus for shaping glass tubing or rod to predetermined curvilinear shapes. Such apparatus is equally well adapted to reshape long tubular discharge lamps and the partially prepared glass tubing for such lamps to various linear curvate shapes.

The principal object of my invention is to provide a readily adaptable templet or form to function as a guide in bending a glass body in a heated and deformable state to various curvate shapes. The use of such a templet or form eliminates many of the short-comings and slowness of other bending operations heretofore employed which are dependent upon the ability of a skilled glass worker alone, or his ability in combination with the use of a specially made rigid templet or form. If the glass body is in the form of tubing or rod only a very short linear extent thereof is heated and worked to shape at one time in either of these previously used methods so that considerable time is expended in shaping any appreciable length thereof. The diversity of shapes of tubing and rod required is so great that the making of a special bending form is not warranted, with the consequent reliance on skilled operators and their limitations in ability. My apparatus provides a bendable templet or form which can be readily reshaped to a contour rendering it usable as a guide in the bending of glass tubing or rod of diverse shapes and which provides, therefore, a convenient and positive means of determining the bent shape of such tubing or rod. The tubing or rod is preferably heated to a bendable condition in an oven or by other means such as an electrical resistance element wrapped thereabout and is pressed against the templet so as to take the accurately defined shape thereof.

Another object of my invention is to provide a bendable templet and means suitably connected thereto and capable of ready and convenient adjustment for bending and retaining said templet in the various curvilinear shapes required in bending glass tube and rod. The desired utility of the bendable templet is provided through the use of means engaging said templet at regular intervals along its length which means is adapted to offset the engaged portions of said templet to bend it to the desired shape. Because of the continuous extent of the templet and means of connection to the adjusting means it takes a regularly curved contour and automatically adjusts itself longitudinally within said means thereby avoiding sharp bends and distortion. Means are also provided in combination with the adjusting means for assisting in making the adjustments conform to the contour of a guide either in the form of a line or a solid body.

Another object of my invention is to provide in combination with a readily shapable templet, means preferably in the form of a bendable platen for working glass tubing or rod into engagement with the templet to cause it to conform thereto. The satisfactory use of the shapable templet requires the use of means of equal utility and reliability for bending the glass tubing or rod. To this end means are provided, preferably in the form of cooperatively shaped means for bending the tubing or rod under controlled pressure exerted either by a weight or spring and such other controls that the tubing or rod is squeezed between said means and the templet and is not reduced in cross sections or otherwise deformed.

Still other objects and advantages of my invention will appear from the following description of species thereof and from the accompanying drawing.

Figure 2:
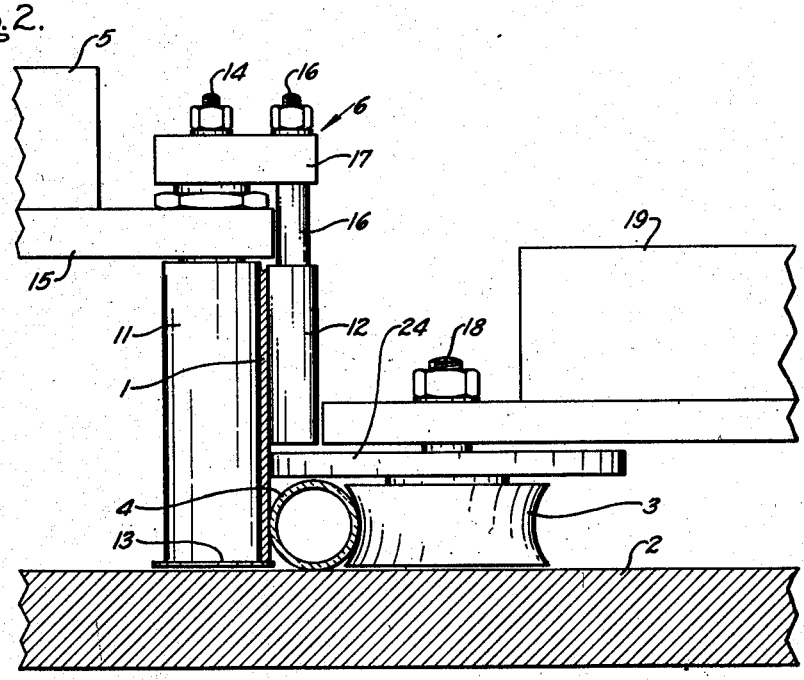

In the drawing, Fig. 1 is a diagrammatic plan view of a species of glass tube or rod bending apparatus of my invention; Fig. 2 is a vertical section on a larger scale through a portion of the apparatus showing the relation of the templet, the glass tubing, the templet holding means and the tube bending means; Figs. 3 and 4 are diagrammatic plan and side views respectively of a modification of the glass tube or rod bending apparatus; Figs. 5, 6, 7 and 8 are schematic plan views of the modified bending apparatus in various steps in the course of operation; Fig. 9 is a diagrammatic plan view of a second modification of my glass tube or rod bending apparatus; Fig. 10 is a side elevation on a larger scale of the indicating means associated with the templet holding means; Figs. 11 and 12 are fragmentary detailed side and plan views respectively of the templet, the platen, and the guiding and holding means therefore of the modified forms of the bending apparatus; Fig. 13 is a side elevation taken from line 13 in Fig. 9 of the friction means for retaining the platen holding means in place; and Figs. 14 and 15 are plan and end views respectively corresponding to Fig. 13 of the friction means.

The specific apparatus shown in Figs. 1 and 2 provides a thin linearly flexible templet 1 arranged perpendicular to the top surface of the table 2, and means comprised essentially of the roller 3 and movable along the length of the templet 1 for bending the glass tube 4 to conform thereto. The contour of the templet 1 which is preferably made from a relatively thin band of heat resistant spring steel is determined by the position of the rods 5 which engage the templet 1 through guiding means 6 at regular intervals along its length and which are held in place by the guides 7 and 8 upstanding from the table 2. The first step in the operation of the apparatus is usually the bending of the templet 1 which must have a shape such that it is capable of guiding the glass tube 4 to the desired shape and is made by longitudinal adjustments to the rods 5 which are based either on the guiding influence of an object placed against the templet 1 in place of the glass tube 4 to be bent or an object or guide line 9 placed opposite the indicating means 10 mounted on the free ends of said rods 5. In either instance the rods 5 are adjusted longitudinally in the guides 7 and 8 and then secured in position either by adjustment to the indicating means 10, the details of which are described hereinafter, or by thumb screws (not shown) extending through the guides 7 or 8 and bearing against the rod 5. The bending of the templet 1 to a curvate shape effects a compensating longitudinal displacement of the templet 1 in the guiding means 6 of the rods 5 which means holds said templet 1 between free running fixed and movable rollers 11 and 12 and which allows the displacement to occur as required. Support for the templet 1 is provided in the guide means 6 by the flange 13 at the lower end of the spindle 14 whereas lateral stability therein is provided by the roller 11 on said spindle 14, which is mounted on an extended portion 15 of the rods 5, and by roller 12 on spindle 16 which is mounted on an arm 17 swivelling on the spindle 14 and swinging about the roller 11 as the curvature of the templet 1 dictates.

Before the bending operation of the apparatus can be initiated, the roller 3 of the bending means which is mounted on the spindle 18 carried by the extended portion of the slide 19 is separated from the templet 1 sufficiently to allow the glass tubing 4 to be placed therebetween. This movement of the bending means can be effected manually by moving the slide 19 to the right (Fig. 1) in the guide members 20 in which it is held against the compression resistance of the spring 21. The glass tube 4 must be preheated, either in a furnace (not shown) nearby or by an electrical resistance element (also not shown) wrapped thereabout, as disclosed in United States Patent 1,534,685, dated April 21, 1925, while resting on the table 2. In the latter instance, the glass tube 4 and the resistance element are treated as one in the bending operation which is brought about by allowing the roller 3 to engage the glass tube 4, or the resistance element in said latter instance, and then moving said roller 3 longitudinally therealong over the extent of the templet 1 so as to bend an equal extent of the glass tube 4. The pressure of engagement of the roller 3 is that of the resilient expansion force of the spring 21 which butts against a lip 22 on the carriage 23, or it could be that of a weight (not shown) suitably attached thereto, and is effective in bending the glass tube 4 until the larger roller 24 co-axial with roller 3 engages the templet 1 and prevents further movement. The roller 24 which is mounted on spindle 18 maintains the proper space between the roller 3 and templet 1 to avoid flattening the glass tube 4 as it is moved therealong, a movement which is produced by manually moving the carriage 23 back and forth along the guides 25 and 26 on the surface of the table 2.

The Figures 3 to 8 inclusive refer to a modified embodiment of the bending apparatus of my invention wherein a shapable templet 1, identical with that in Figs. 1 and 2, is provided in combination with similarly shapable means 27 for bending the glass tube 4 to conform thereto. The shapable bending means 27 is comprised of a movable platen or templet 28 of a length corresponding to that of the shapable templet 1 which platen 28 is adapted to be shaped as required to cooperate in bending the glass tube 4. Because of the corresponding length of the templet 1 and the platen 28, the entire length of the glass tube 4 is shaped in one quick operation thereby reducing the temperature to which said glass tube 4 must be heated to retain its plasticity throughout said bending operation and thereby reducing the probability of collapse and injury during the heated period.

The procedure of operation of this bending apparatus corresponds to that previously described in that the thin metal templet 1 is first caused to take the shape which effects the proper bend in the glass tubing 4. Shaping of the templet 1 is brought about by longitudinal adjustments of the rods 5 in the guides 7 and 8 according to a comparison of the indicating means 10 on said rods 5 and a line pattern 9 (Fig. 5). The opposite ends of the rods 5 are connected to the shapable templet 1 by guiding means 6 like that shown in detail in Fig. 2 which allows the templet 1 to adjust itself both longitudinally and angularly as the desired shape dictates.

The next operation concerned with the operation of the modified apparatus is the shaping of the platen 28 which is preferably made of a thin strip of heat resistant metal and which takes a shape determined by the position of guiding means 6' mounted on the ends of rods 29 at regularly spaced intervals along its length. The platen 28, the guiding means 6' and adjacent ends of the rods 29 are identical with the templet 1, the guiding means 6 and adjacent ends of the rod 5 but are adjusted differently since the platen 28 engages the opposite side of the glass tube 4 from the templet 1 and therefore must have somewhat different cooperating curvature. The most convenient way of establishing the shape of the platen 28 is to place a substitute body 30 for the glass tube 4 in its final shape, either a previously shaped tube or a flexible body such as a rubber body or coiled spring, against the templet 1 and then adjust the platen 28 and rods 29 into agreement therewith. A very limited clearance can be allowed between the platen 28 and the substitute body 30 if desired. This adjustment of the platen 28 is easily effected as the rods 29 are retained in the guides 31 and 32 on a carriage 33 movable toward and away from the templet 1 and adjust themselves substantially to the proper position when said carriage 33 is advanced to the limit of its motion toward said templet 1, as determined by the stop 34. Friction means 35 associated with the carriage 33 and only diagrammatically illustrated in the present instance prevent movement of the rods 29 and a change in shape of the platen 28 when the carriage 33 is again moved away from templet 1 and the substitute body 30 is removed.

The modified bending apparatus appears as shown in Fig. 6, with the templet 1 and the platen 28 properly shaped and separated, when fully prepared for the bending operation. As in the previously described apparatus it is immaterial whether a heated and workable glass tube 4 is placed between the templet 1 and the platen 28 or whether said tube 4 is heated by an electrical resistance element while in said position; however, said tube 4 is pressed and bent to conform to the templet 1 by movement of the carriage 33 pressing the platen 28 thereagainst. Guide rails 36 on the table 37 assure movement of the carriage 33 to proper relation to the templet 1 in succeeding bending operations which are complete when the carriage 33 butts against the stop 34. The platen 28 and carriage 33 are moved back away from the glass tube 4 after sufficient time lapses for it to cool and take a permanent set.

The second modification of my bending apparatus which appears in Fig. 9 corresponds to the apparatus previously described in that a shapable templet 1 is provided and a shapable platen 28 is mounted opposite thereto. Each cycle of operation of the present bending apparatus, however, provides for the shaping of both the templet 1 and platen 28 in the normal operations of bending the glass tube 4 therebetween and therefore is initiated with both the templet 1 and the platen 28 in substantially straight form as shown. The templet 1 is held by guide means 6 on the rods 5 which are retained by the guides 7 and 8 on a movable carriage 38 and is positioned at an initial rest position by the engagement of the pins 39 in rods 5 with the stop pins 40 in said carriage 38. The platen 28 is similarly held by the guide means 6' on the rods 29 which are retained by guides 31 and 32 mounted on the table 41 of the apparatus and is positioned initially at a position wherein the pins 42 on the rods 29 engage the stop pins 43 in said table 41. Resilient means such as the springs 44 located between the ends of the rods 29 and upstanding protuberances 45 on the table 41 or weighted means (not shown) keep the rods 29 as far to the left as the stop pins 43 permit thereby establishing the initial position of said platen 28.

The shape to which the glass tube 4 is to be bent by the apparatus shown in Fig. 9 is, as in the other apparatus, preset therein; however, the setting is made in a plurality of push rods 46 mounted in the guides 47 and 48 of the carriage 49 which rods 46 are arranged to engage, through movements of the carriage 49, the ends of rods 5 and displace said rods 5, the templet 1 and platen 28 sufficiently to effect the shaping. The rods 46 are set according to a comparison of a guide line 9 and indicating means 10 and are preferably secured in that arrangement by thumb screws (not shown) passing through the guides 47 and bearing against said rods 46.

Initially the templet 1 is separated some distance from the platen 28 since the carriages 38 and 49 are correspondingly further to the left and ready access is allowed to permit the placing of the glass tube 4 on the table 41 in front of the platen 28. The bending operation is performed by moving the templet 1 toward the platen 28 through the expedient of moving the carriage 38 to the right to such an extent that the templet 1 engages the glass tube 4 and pushes it tightly against the platen 28 as shown. The carriage 49 is then immediately moved to the right (Fig. 9) to the limit of its course of movement which carries the ends of the rods 46 thereof against the end of the rods 5 and displaces both the templet 1 and the platen 28 laterally as need be to shape the glass tube 4 therebetween. Guides 50—50 on the table 41 determine the direction of movement of both carriages 38 and 49. At the limit of movement and completion of the bending of the tube 4, the friction means 35 (to be described in detail) is adjusted to grip and hold the rod 29 in place so that the templet 1 and platen 28 remain in bent shape during an interval in which the tube 4 is allowed to cool and harden. The carriage 49 is withdrawn from position during this interval as the pressure exerted by the springs 44 or weighted means associated with the platen 28 are prevented from disturbing the position of the other parts of the apparatus because of the resistance of the friction means 35. After the cooling interval the carriage 38 is moved to separate the templet 1 from the glass tube 4 which then can be removed from the apparatus. Releasing the friction means 35 allows the platen 28 to return to its straight position and prepares the apparatus for a succeeding cycle of operation. The present modification is of particular advantage since the templet 1 and the platen 28 of the apparatus and the glass tube 4 adjust themselves in a linear direction to compensate for their curvilinear shape at the same time thereby avoiding a separate movement of the glass tube 4 and a possible deformation thereof.

Various details of the essential elements of the embodiment and modifications of the bending apparatus appear in the following figures, of which Fig. 10 illustrates one form of indicating means 10 which is adapted for use with the templet holding rods 5 of the embodiment and the first modification Figs. 1 and 3 respectively and the push rods 46 of the second modification Fig. 9 of the bending apparatus. The indicating means 10 comprises a vertical pin 52 having a pointed end 53 adjacent the surface of the table 2, 37 or carriage 49 in respective instances which end 53 serves to indicate against a line drawing placed on the table 2, 37 or carriage 49 the position of the rod 5 or push rod 46. The pin 52 is slidable vertically in the end of the rod 5 or push rod 46 against the friction of the spring finger 54 and can be pushed down by manual pressure against the head 55 thereof to embed the pointed end 53 in the table 2, 37 or carriage 49 to secure the rod 5 or push rod 46 in place. A cylindrical sleeve 56 corresponding in size to the templet engaging roller 11 at the opposite end of rod 5 is also mounted over the lower end of the pin 52 so the somewhat modified curved form of the templet 1 can be shown more accurately. The sleeve 56 can also function to accurately position the rod 5 and templet 1 when a body 57 having a contour corresponding to the shape desired in the glass tube 4 is provided as a guide. In such instance the templet 1 takes the contour of the body 57 when the sleeve 56 rests against said body 57.

In Figs. 11 and 12 are shown the guiding means 6 and 6' associated with the templet 1 and platen 28 of the modifications of the bending apparatus in the relation they maintain during bending of the glass tube 4. As shown both guiding means 6 and 6' are of identical construction, the templet 1 being supported and held in place by the head 13 of spindle 14 and the rollers 11 and 12 whereas the platen 28 is supported and held in place by the head 13' of spindle 14' and the rollers 11' and 12'. Arm 17' allows the roller 12' to swivel freely.

A detailed showing of the friction means 35 which is used in combination with each of the rods 29 to control the position of the platen 28 of the modified bending apparatus appearing in Figs. 3 and 9, is disclosed in Figs. 13, 14 and 15. The bar 29 is engaged in each instance of both modifications by a rubber shoe 58 on a pivoted lever 59 which provides the means of gripping and holding said rod 29 and by a roller 60 on a stud 61 thereby keeping said rod 29 in place under the pressure of engagement of the shoe 58. The lever 59 and the stud 61 associated with each of the rods 29 of the modification are supported by an angular cross member 62 which is mounted at a fixed position over the entire group of the rods 29 of the modification. In normal periods of operation the rods 29 remain in one position and are held by the pressure of engagement of the shoe 58 which pressure is the expansion force of a spring 63 extending between the lever 59 and a post in the cross member 62 and which turns said lever 59 about the stud 64 also extending from said cross member 62. The friction means 35 of a modification is released when the shape of the platen 28 is to be changed by adjustment of the rod 65, which is connected to the levers 59 by the screw 66, in the direction indicated by the arrow 67.

What I claim as new and desire to secure by Letters Patent of the United States is:

1. Apparatus for bending a heated and deformable glass body to a desired shape comprising the combination of a table for supporting the glass body, a readily shapable templet comprised of a flexible strip perpendicular to the table, adjustable means mounted on the table and engaging linearly spaced portions of the strip for bending and holding said strip in a curvilinear shape, and means for bending the glass body against the strip to cause said glass body to conform to the shape thereof.

2. Apparatus for bending a heated and deformable glass body to a desired shape comprising the combination of a table for supporting the glass body, a readily shapable templet comprised of a flexible strip perpendicular to the table, adjustable means mounted on the table and engaging linearly spaced portions of the strip for bending and holding said strip in a curvilinear shape, means mounted on said last-mentioned means at a position spaced from the strip and adjacent the table for assisting in the adjustment of said last-mentioned means with respect to a guide placed on the table, and means for bending the glass body against the strip to cause said glass body to conform to the share thereof.

3. Apparatus for bending a heated and deformable glass body to a desired shape comprising the combination of a table for supporting the glass body, a readily shapable templet comprised of a flexible strip perpendicular to the table, adjustable means mounted on the table and engaging linearly spaced portions of the strip for bending and holding said strip in a curvilinear shape, means mounted on said last-mentioned means and engaging the table for securing said means in place after adjustment, and means for bending the glass body against the strip to cause said glass body to conform to the shape thereof.

4. Apparatus for bending a heated and deformable glass body to a desired shape comprising the combination of a table for supporting the glass body, a readily shapable templet comprised of a flexible strip perpendicular to the table, adjustable means mounted on the table and engaging linearly spaced portions of the strip for bending and holding said strip in a curvilinear shape, means mounted on said last-mentioned means at a position spaced from the strip comprised of a movable pointed pin adapted to be forced into the table for assisting in adjustment of said last-mentioned means with respect to a guide placed on the table and to thereafter secure said means in place, and means for bending the glass body against the strip to cause said glass body to conform to the shape thereof.

5. Apparatus for bending a heated and deformable glass body to a desired shape comprising the combination of a table for supporting the glass body, a readily shapable templet comprised of a flexible strip perpendicular to the table, adjustable means mounted on the table comprised of cylindrical members engaging linearly spaced portions of the strip for bending and holding said strip in a curvilinear shape, means mounted on said last-mentioned means at a position spaced from the strip comprised of cylindrical pins corresponding in size to the cylindrical members thereof for assisting in the adjustment of said means and indicating the position taken by respective portions of the strip, and means for bending the glass body against the strip to cause said glass body to conform to the shape thereof.

6. Apparatus for bending a heated and deformable glass body to a desired shape comprising the combination of a readily shapable templet comprised of a flexible strip, adjustable means for bending said strip laterally to a curvilinear shape comprised of pairs of fixed and movable cylindrical rollers on opposite sides of linearly spaced portions of said strip and means swiveling about the fixed rollers for supporting the movable rollers, and means for bending the glass body against the strip to cause said glass body to conform to the shape thereof.

7. Apparatus for bending a heated and deformable glass body to a desired shape comprising the combination of a readily shapabe templet comprised of a flexible strip, adjustable means engaging linearly spaced portions of the strip for bending and holding said strip in a curvilinear shape, and means for bending the glass body against the strip to cause said glass body to conform to the shape thereof comprised of a roller, resilient means for pressing said roller against the glass body, and means for moving said roller along the length of the strip.

8. Apparatus for bending a heated and deformable glass body to a desired shape comprising the combination of a readily shapable templet comprised of a flexible strip, adjustable means engaging linearly spaced portions of the strip for bending and holding said strip in a curvilinear shape, and means for bending the glass body against the strip to cause said glass body to conform to the shape thereof comprised of a roller, resilient means for pressing said roller against the glass body, a second larger roller rotatable with the first roller and adapted to engage the strip when the engaged portion of the glass body conforms thereto, and means for moving said rollers along the length of the strip.

9. Apparatus for bending a heated and deformable glass body to a desired shape comprising the combination of a readily shapable templet comprised of a flexible strip, adjustable means engaging linearly spaced portions of the strip for bending and holding said strip in a curvilinear shape, a bendable platen located opposite the strip, means engaging linearly spaced portions of the platen for bending said platen laterally to a curvilinear shape cooperating with that of the strip comprised of fixed and movable rollers on opposite sides of said platen and of means swiveling about the fixed rollers for supporting the movable rollers, and means for causing a relative movement between the strip and the platen to bend a glass body therebetween against said strip so as to cause said glass body to conform to the shape thereof.

10. Apparatus for bending a heated and deformable glass body to a desired shape comprising the combination of a readily shapable templet comprised of a flexible strip, adjustable means engaging linearly spaced portions of the strip for bending and holding said strip in a curvilinear shape, a bendable platen located opposite the strip, resilient means engaging linearly spaced portions of the platen for resisting deformation thereof, and means producing a relative movement of the strip and platen toward each other to cause a glass body therebetween to be bent to conform to the shape of the strip as the pressure of engagement of said strip bends the platen to cooperative shape.

11. Apparatus for bending a heated and deformable glass body to a desired shape comprising the combination of a readily shapable templet comprised of a flexible strip, adjustable means engaging and holding linearly spaced portions of the strip, a bendable platen located opposite the strip, resilient means engaging linearly spaced portion of the platen for resisting deformation thereof, and means defining a curvate shape and movable into engagement with the adjustment means to readjust the same and for causing the strip to press a glass body against the platen and finally, through said engagement, to reshape the strip and platen to such cooperative form to cause the glass body to be shaped as desired.

12. In apparatus of the class described, a mold comprising a flexible strip-shaped templet, a plurality of guide members comprising parallel rollers spaced to engage opposite sides of said templet at a plurality of adjacent points along its length, means mounting said guide members for adjustment relative to each other in a direction substantially normal to the plane of the templet whereby to bend the templet to a desired curvature with accompanying displacement of the templet within said guide members, and means to secure the said guide members in adjusted position.

13. In apparatus of the class described, a mold comprising a flexible strip-shaped templet, a plurality of guide members comprising parallel rollers spaced to engage opposite sides of said templet at a plurality of adjacent points along its length, one of said rollers being mounted to pivot about the axis of the other roller, means mounting said guide members for adjustment relative to each other in a direction substantially normal to the plane of the templet whereby to bend the templet to a desired curvature with accompanying displacement of the templet within said guide members, and means to secure the said guide members in adjusted position.

14. In apparatus of the class described, the combination of a support, relatively stationary and movable molds mounted on said support in opposed relationship, each of said molds comprising a cooperating flexible strip-shaped templet and a plurality of parallel adjacent bar means substantially in a plane normal to the plane of the templet and provided at their contiguous ends with pairs of transverse finger means spaced to engage opposite sides of the templet at a plurality of adjacent points along its length, means mounting the several bar means of the stationary mold on said support for independent rectilinear readjustment upon deformation of the associated templet and means yieldably urging the said several bar means to their normal preadjusted positions, carriage means mounted on said support and carrying the movable mold and having thereon means mounting the associated bar means for independent rectilinear adjustment to deform the associated strip, a second carriage mounted on said support at the side of the first-mentioned carriage opposite the stationary mold, a plurality of bar means on the second carriage corresponding to the bar means of the movable mold and in longitudinal alignment therewith, means mounting the bar means on said second carriage for independent rectilinear adjustment thereon and for securing the said bar means in adjusted position.

MAURICE MAUGÉ.

REFERENCES CITED

The following references are of record in the file of this patent:

UNITED STATES PATENTS

| Number | Name | Date |
|---|---|---|
| 608,905 | Pilkington | Aug. 9, 1898 |
| 991,025 | Robier | May 2, 1911 |
| 1,111,958 | Goffin et al. | Sept. 29, 1914 |
| 1,118,579 | Pilkington | Nov. 24, 1914 |
| 2,208,958 | Brown et al. | July 23, 1940 |

FOREIGN PATENTS

| Number | Country | Date |
|---|---|---|
| 845,786 | France | Sept. 1, 1949 |